May 10, 1966 H. B. IRVIN 3,250,313
EVAPORATION AND SEPARATION CONTROL PROCESS
Filed July 16, 1962
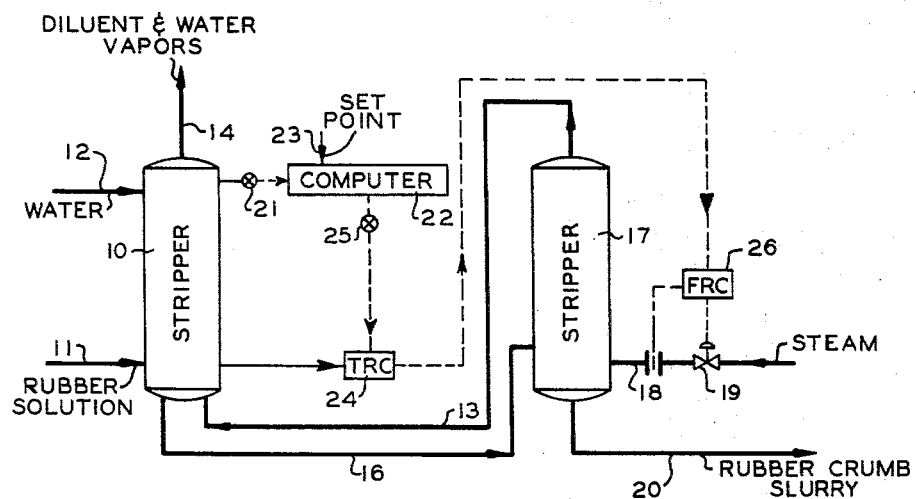
INVENTOR.
H.B. IRVIN
BY *Young + Drigg*
ATTORNEYS

United States Patent Office 3,250,313
Patented May 10, 1966

3,250,313
EVAPORATION AND SEPARATION
CONTROL PROCESS
Howard B. Irvin, Bartlesville, Okla., assignor to Phillips
Petroleum Company, a corporation of Delaware
Filed July 16, 1962, Ser. No. 210,054
4 Claims. (Cl. 159—47)

This invention relates to a method of and apparatus for controlling a process. In another aspect, this invention relates to an improved method of and apparatus for controlling a separation process wherein a process variable is manipulated in response to a process variable measurement and a determination representative of the effectiveness of the separation process. In another aspect, this invention relates to an improved method of and apparatus for the separation of a rubbery polymer from a solution of said rubber polymer.

There is a continuous effort in the chemical industry to develop more highly refined methods of process control. The control of continuous separation processes is particularly important and difficult in those separation processes wherein a first fluid containing a constituent of interest is passed to a separation zone; a second fluid is passed to said separation zone; and said second fluid is withdrawn from said separation zone containing said consitituent of interest. A typical example of such a separation process wherein control is highly important is in the separation of a rubbery polymer from a solution of said rubbery poymer. A conventional method of spearation comprises contacting a solution of rubbery polymer in a separation zone with steam, withdrawing an overhead solvent and water vapor stream from said separation zone, and withdrawing from said separation zone an aqueous slurry of the rubber. It is desirous in such a separation, or stripping process, to produce a slurry free of solvent.

According to my invention, an improved method of and apparatus for controlling a separation or stripping process is provided wherein a liquid feed is passed to a stripping zone; a stripping vapor is passed to said separation zone; a vapor is withdrawn from said separation zone comprising said stripping vapor and a portion of the liquid feed; and the remainder of said liquid feed is withdrawn from said separation zone. The method of control comprises measuring the pressure in the upper region of said stripping zone and manipulating a stripping process variable responsive to said pressure measurement.

Accordingly, an object of my invention is to provide a method of and apparatus for controlling a separation process.

Another object of my invention is to provide an improved method of and apparatus for controlling a separation process wherein at least a portion of liquid feed is stripped from the remainder of the liquid feed.

Another object of my invention is to provide an improved method of and apparatus for controlling a separation process wherein a liquid containing a constituent of interest is contacted with steam and said constituent of interest substantially free of said liquid is recovered from the separation process.

Another object of my invention is to provide an improved method of and apparatus for separating the rubber from a solution containing said rubber.

Other objects, advantages, and features of my invention will be readily apparent to those skilled in the art from the following description and the appended claims.

The inventive method of control and apparatus therefor will hereinafter be described as applied to the specific separation of rubber from a solution of rubber. It is not, intended to limit the invention thereto as the principles disclosed herein can be readily adapted by those skilled in the art to control other processes of like nature such as the separation of a poly-1-olefin from a solution of said poly-1-olefin.

The drawing is a schematic representation of one embodiment of the inventive control system.

The term "rubbery polymer" as hereinafter employed can comprise a polymerized conjugated diene containing from 4 to 8, inclusive, carbon atoms per molecule. Examples of conjugated dienes which can be employed include 1,3-butadiene, 2-methyl-1,3-butadiene (isoprene), 2,3-dimethyl-1,3-butadiene, 2-methyl-1,3-pentadiene, chloropene, 2,3-dimethyl-1,3-pentadiene, 2-methyl-3-ethyl-1,3-pentadiene, 2-methoxybutadiene, 2-phenylbutadiene, and the like. The above conjugated dienes can be polymerized either alone or in admixture with each other and/or with one or more compounds containing an active $CH_2=C<$ group which are copolymerizable therewith. Included among these latter compounds are aliphatic 1-olefins having up-to and including 8 carbon atoms per molecule, such as ethylene, propylene, 1-butene, 1-hexene, 1-octene. Branched chain olefins, such as isobutylene, can be employed as well as 1,1-dialkyl-substituted and 1,2-dialkyl-substituted ethylene such as butene-2, pentene-2, hexane-2, heptene-2, 2-methylbutene-1, 2-methylhexene-1, 2-ethylheptene-1, and the like. Other olefins which can be employed include di- and polyolefins, such as 1,5-hexadiene, 1,4-pentadiene, and 1,4,7-octatriene, and cyclic olefins, such as cyclohexane. Other examples of compounds containing an active $CH_2=C<$ group which are copolymerizable with one or more of the conjugated dienes are styrene, divinylbenzene, 3-vinyltoluene, 1-vinylnaphthalene, 3-methylstyrene, acrylonitrile, methacrylonitrile, methacrylate, methyl methacrylate, vinyl acetate, vinyl chloride, 2-methyl-5-vinylpyridine, 2-vinylpyridine, and the like.

Solvents suitable for use in the polymerization process and subsequently removed in the separation process are hydrocarbons which are substantially inert and non-detrimental to the polymerization reaction and include aromatics, such as benzene, toluene, xylene, ethylbenzene and mixtures thereof; straight and branched paraffins which contain up to and including 12 carbon atoms per molecule including normal pentane, isopentane, normal hexane, isohexane, 2,2,4-trimethylpentane (isooctane), normal decane, mixtures of these paraffinic hydrocarbons and the like; aromatic halides, such as chloronaphthalene and the like; and cyclic paraffins, such as cyclohexane and methylcyclohexane. Furthermore, mixtures of any of the aforementioned compounds can be employed as diluents.

Referring to the drawing, a solution of rubbery polymer comprising a rubbery polymer and a solvent is passed via conduit means 11 to a separation (stripper) vessel 10. Water is passed to stripper vessel 10 via conduit means 12. Steam and diluent vapors, from a source hereinafter described, are transmitted via conduit means 13 to stripper vessel 10. The temperature and pressure of stripper (stripping zone) vessel 10 is maintained in the range of about 150–225° F. and in the range of about 5–25 p.s.i.a., respectively, with the specific temperature and pressure employed dependent upon the specific diluent and the rubbery polymer present in the feed stream.

An overhead vaporous stream comprising solvent (stripped vapor) and water vapor is withdrawn from the upper region of stripper vessel 10 via conduit means 14. A slurry comprising water and rubber is withdrawn from the lower region of stripper vessel 10 via conduit means 16 and passed to a stripper vessel 17. Preferably, a dispersant such as a sodium salt of a copolymer of maleic anhydride and diisobutylene, disclosed in copending application Serial No. 63,888 by J. Mitacek, C. Mariz, and E. Pennington, filed October 20, 1960, or the product sold by Rohm and Haas under the trademark Tamol 731, is introduced into stripper vessel 10 with the water via conduit means 12. The dispersant acts to disperse the rubber in stripper vessel 10, thereby aiding in the removal of said rubber as a slurry via conduit means 16.

Within stripper vessel 17, the slurry is contacted with steam passed to stripper vessel 17 via conduit means 18 and control valve 19. A vaporous overhead stream comprising solvent and steam is withdrawn from the upper region of stripper vessel 17 and passed via conduit means 13, as heretofore described, to stripper vessel 10. Rubber crumb slurried in water is withdrawn from stripper vessel 17 and passed via conduit means 20 to further processing steps.

Although the separation of solvent and rubber by the employment of two stripper or separation vessels has herein been illustrated, it is within the scope of this invention to perform the separation or stripping operation in one stripping vessel or to employ three or more stripping vessels in order to effectively separate the solvent and rubber.

The flow of materials through the separation process having been discussed above, the control features of the invention will now be described in more detail. It has been observed that effective separation of the solvent from the rubber solution feed with a minimum quantity of steam can be obtained by maintaining the weight ratio of steam to solvent in the vapors withdrawn from stripper 10 via conduit means 14 substantially constant. I have by my invention provided a method of and apparatus for controlling the separation of solvent from a rubber solution whereby the pressure in the upper region of stripper 10 is measured, a corresponding desired stripping zone temperature required to maintain the weight ratio of steam to solvent in the withdrawn vapor substantially constant determined, and the stripping zone temperature manipulated responsive to said determination.

Referring again to the drawing, the pressure in the upper region of stripper 10 or within conduit 14 is sensed and a signal representative of said pressure measurement transmitted by a conventional pressure transmitter 21 to a computer 22. Computer 22 must be capable of relating the desired stripping zone temperature to the measured pressure so as to maintain the weight ratio of stripping vapor (steam) to solvent vapor substantially constant. It has been found that in the separation of a solvent from a rubbery polymer that computer 22 must be capable of solving an equation of the following form:

$$t = a - b(R) + c(\log_{10} P)$$

where $t$ is the desired temperature of the stripping zone in degrees F.; $a$, $b$, and $c$ are constants; R is the weight ratio of diluent to steam in the overhead vapors withdrawn from stripper 10 via conduit means 14; and P is the stripper pressure in p.s.i.a. transmitted by pressure transmitter 21. It has been discovered that in the separation of a solvent from a polymer comprising cis-polybutadiene that the above equation becomes:

$$t = 77.86 - 6.998R + 113.5 \log_{10} P$$

Computer 22 can be a conventional small analog computer such as Electronic Analog Computer MODEL TR–10 manufactured by Electronic Associates, Long Branch, New Jersey. The weight ratio of solvent to steam in the overhead vapors (R) is introduced into computer 22 as a set point 23.

A signal representative of the desired stripping zone temperature is transmitted from computer 22 via conventional E.M.F.-to-pneumatic transducer 25 as a reset signal to a conventional temperature-recorder-controller 24. A signal representative of the stripping zone tempeature in the lower region of stripper 10 is transmitted to conventional temperature-recorder-controller 24. Temperature-recorder-controller 24 compares the two input signals and transmits a reset signal in response to said input signals to a conventional flow-recorder-controller 26.

Flow-recorder-controller 26 opens and closes control valve 19 responsive to the reset signal received from temperature-recorder-controller 24 and to a rate of flow measurement through conduit 18. Thus, flow-recorder-controller 26 manipulates the rate of flow of steam through conduit 18 so as to attain a stripping zone temperature in the lower region of stripper 10 as determined or computed by computer 22 responsive to a pressure measurement in the upper region of stripper 10.

It is also within the scope of this invention to measure the pressure in the upper region of stripper 10 and to manipulate the temperature of the stripping zone so as to maintain the difference beween the strpping zone temperature and the steam distillation temperature at a given pressure substantially constant. Referring again to the drawing, a signal representative of the pressure measurement in the upper region of stripper 10 is transmitted by transmitter 21 to computer 22. In this case (second embodiment), computer 22 must be capable of solving an equation relating the desired stripping zone temperature to the measured pressure with the difference between the stripping zone temperature and the steam distillation temperature maintained constant. It has been discovered that in the separation of a solvent from a rubbery polymer computer 22 must be capable of solving an equation of the following form:

$$t = d + e(\Delta t) + f (\log_{10} P$$

where $t$ is the desired stripping zone temperature in degrees F.; $d$, $e$ and $f$ are constants; and $\Delta t$ is equal to the stripping zone temperature minus the steam distillation temperature at a given pressure. The steam distillation temperature is that temperature at which the sum of the partial pressures of the pure solvent vapor and water vapor is equal to the total pressure of the system. In other words, the steam distillation temperature is the boiling point of the mixture of liquid solvent and water at the existing pressure in the stripping zone. It has further been discovered that in the separation of a solvent from a polymer comprising cis-polybutadiene the above equation becomes:

$$t = 47.04 + 0.977 \Delta t + 117.08 \log_{10} P$$

Set point 23 introduced into computer 22 is representative of $\Delta t$ of the above equation.

Although the invention has been described as particularly applied to the separation of solvent from a rubber solution, this invention is applicable to separation processes broadly wherein a liquid feed is contacted with a stripping vapor in a contact zone, a portion of the liquid feed withdrawn from said contact zone, and a vaporous product stream comprising said stripping vapor and the remainder of the liquid feed withdrawn from said contact zone.

As will be evident to those skilled in the art, various modifications of this invention can be made, or followed, in the light of the foregoing disclosure and discussion without departing from the spirit or scope thereof.

I claim:

1. In a process which comprises passing a solvent solution of a rubbery polymer to a stripping zone, passing water to said stripping zone and therein intimately contacting said solvent solution of said rubbery polymer, passing steam to the lower region of said stripping zone and therein maintaining stripping contact with said solution and said water, withdrawing a vapor from the upper region of said stripping zone comprising steam and solvent vapor, and withdrawing from the lower region of said stripping zone a slurry comprising water and rubbery polymer; a method of control which comprises passing a first signal representative of the total pressure in the upper region of said stripping zone to a computing zone, said computing zone solving the following equation:

$$t = a - b(R) + c (\log_{10} P)$$

where $t$ is the desired stripping temperature in degrees F. in said lower region so as to maintain the weight ratio of solvent to water in said vapor withdrawn from said stripping zone substantially constant, $a$, $b$, and $c$ are constants, P is said pressure in p.s.i.a. in said upper region of said stripping zone, and R is the weight ratio of solvent to water in said vapor withdrawn from said stripping zone, passing a second signal representative of said desired stripping zone temperature to a control zone, passing the third signal representative of the temperature in said lower region within said stripping zone to said control zone, and passing a fourth signal from said control zone to a means for manipulating said temperature of said stripping zone responsive to said second and third signals.

2. The process of control of claim 1 wherein said solution of rubbery polymer comprises a solution of cis-polybutadiene and wherein the equation solved by said computing zone becomes $$t = 77.86 - 6.998R + 113.5 \log_{10} P$$

3. In a process which comprises passing a solvent solution of rubbery polymer to a stripping zone, passing water to said stripping zone and therein intimately contacting said solvent solution of said rubbery polymer, passing steam to the lower region of said stripping zone and therein maintaining stripping contact with said solvent solution of said rubbery polymer and water, withdrawing from the upper region of said stripping zone a vapor comprising water vapor and solvent vapor, and withdrawing from the lower region of said stripping zone a slurry comprising water and rubbery polymer; a method of control which comprises passing a first signal representative of the total pressure in the upper region of said stripping zone to a computing zone, said computing zone solving the following equation:

$$t = d + e(\Delta t) + f (\log_{10} P)$$

where $t$ is the desired stripping temperature in degrees F. in said lower region to maintain the weight ratio of water vapor to solvent in said vapor withdrawn from said upper region of said stripping zone substantially constant, $d$, $e$, and $f$ are constants, P is said measured pressure in p.s.i.a. in said upper region of said stripping zone, and $\Delta t$ is equal to said stripping temperature minus the steam distillation temperature at said pressure P, passing a second signal representative of said desired stripping zone temperature to a control zone, passing a third signal representative of a temperature measurement within said lower region of said stripping zone to said control zone, and passing a fourth signal from said control zone to a means for manipulating said temperature of said lower region of said stripping zone responsive to said second and said third signals.

4. The process of control of claim 3 wherein said solution of rubbery polymer comprises a solution of cis-polybutadiene and wherein the equation solved by said computing zone becomes $$t = 47.04 + 0.977\Delta t + 117.08 \log_{10} P$$

References Cited by the Examiner

UNITED STATES PATENTS

| | | | |
|---|---|---|---|
| 390,960 | 10/1888 | Gustin | 137—90 |
| 2,684,326 | 7/1954 | Boyd | 196—132 X |
| 2,737,965 | 3/1956 | Newman | 137—90 |
| 2,748,849 | 6/1956 | Hart | 159—44 |
| 2,882,693 | 4/1959 | Clay | 202—160 |
| 2,890,156 | 6/1959 | Vautrain | 202—160 |
| 2,994,643 | 8/1961 | Smalling | 196—132 |
| 3,042,637 | 7/1962 | Croutch | 159—44 |
| 3,050,450 | 8/1962 | Kleiss et al. | 202—160 |
| 3,108,929 | 10/1963 | Tolin et al. | 202—160 |

OTHER REFERENCES

Heat Power Engineering—Barnard, Ellenwood and Hirshfeld, part I, 3rd edition, John Wiley and Sons Inc., New York, page 84, printed June 1932.

Webber: "Control by Temperature Difference," Petroleum Refiner, May 1959, vol. 38, No. 5, pp. 187–191 inclusive, particularly p. 188, col. 1 bottom and col. 2 top.

NORMAN YUDKOFF, *Primary Examiner.*

J. SOFER, *Assistant Examiner.*